May 20, 1952     R. A. BAUDRY ET AL     2,597,055
FRETTING CORROSION-PREVENTING MEANS
Filed Nov. 26, 1948
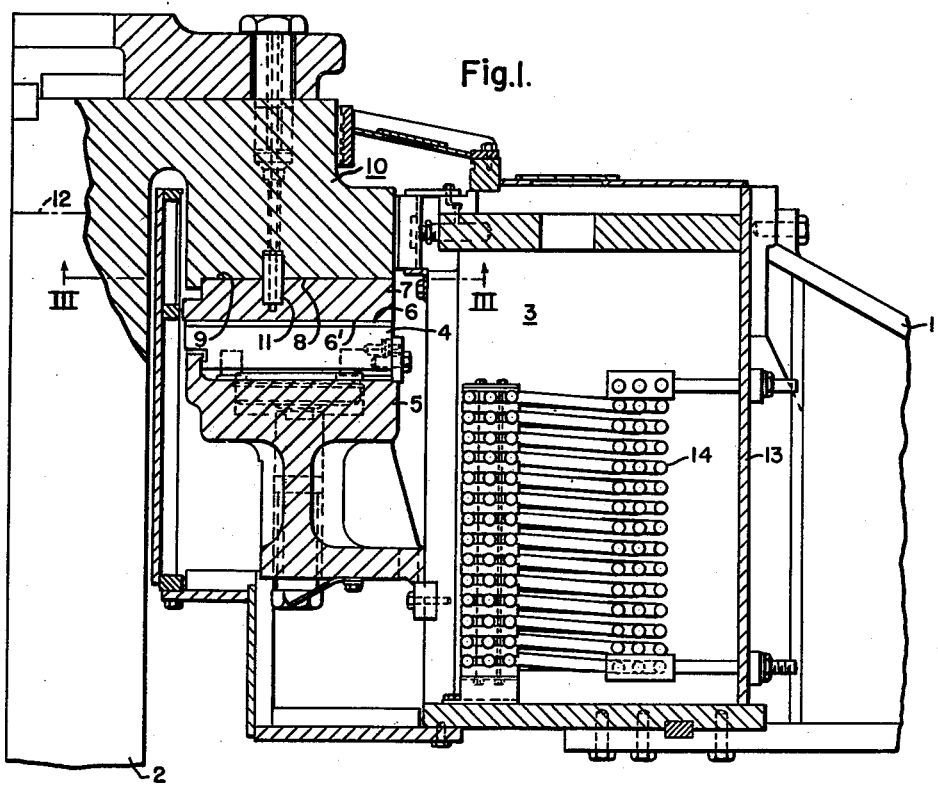
Fig.1.
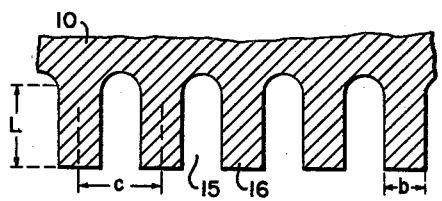
Fig.2.
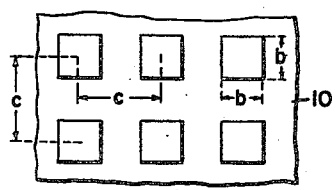
Fig.3.
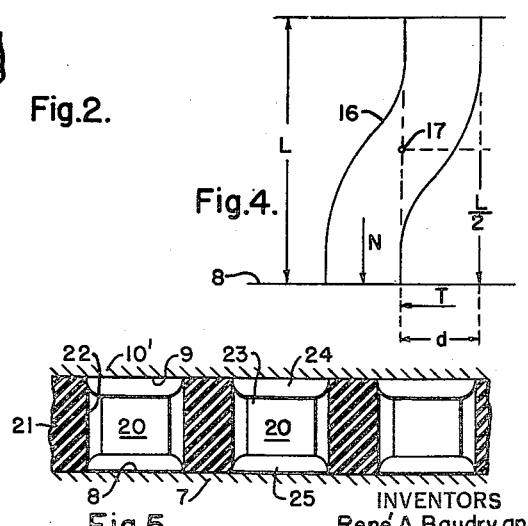
Fig.4.
Fig.5.
WITNESSES:
H. F. Susser.
Nw. C. Groove
INVENTORS
René A. Baudry and
Paul R. Heller.
BY O. B. Buchanan
ATTORNEY Patented May 20, 1952

2,597,055

UNITED STATES PATENT OFFICE 2,597,055

FRETTING CORROSION PREVENTING MEANS

René A. Baudry, Pittsburgh, and Paul R. Heller, Irwin, Pa., assignors to Westinghouse Electric Corporation, East Pittsburgh, Pa., a corporation of Pennsylvania Application November 26, 1948, Serial No. 62,166

3 Claims. (Cl. 308—160)

Our invention relates to means for preventing (and by preventing we mean at least ameliorating), a type of corrosion or erosion which has received considerable engineering-attention in recent years, and which has come to be known as fretting corrosion. It is a phenomenon whereby the two abutting surfaces of two members which are resting against each other, without any apparent movement between them, nevertheless show signs of wear, sometimes to the extent of requiring replacement of parts within a few years, or even a shorter space of time. Analysis seems to have shown that, at least in many cases, one of the two abutting members is a plate, the other side of which is subjected to variable localized pressures normal to the surface of the plate. Tests have shown that these localized variable pressures spread out as they are transmitted through the pressure-plate, resulting in an extremely small tangential fretting-movement, of the order of a few micro-inches, at the abutting back-surface of the pressure-plate, which causes minute frictional motions or slippages between different portions of the two abutting surfaces. It is these small relative motions or slippages, in whatever manner they may be caused, which, for some as yet unexplained reason, apparently cause accelerated oxidation at the abutting surfaces, causing said surfaces to become pitted and to be eaten away, in what is known as fretting corrosion.

The means for dealing with this relatively new phenomenon are extremely limited. Thus far, the search for suitable pairs of dissimilar materials, or oxide-resistant materials or surface-coatings, or the presence of lubricants between these abutting surfaces, have shown some variation in the rate of wear, but none of said means has so far been found to give anything like complete immunity. So far, at least in those cases where the relative slippage between corresponding points in the abutting surfaces is caused by variable localized normal pressures on the other side of the pressure-plate, the best way of preventing fretting corrosion is to make the pressure-plate sufficiently thick so that the tangential fretting-movements of points on its back-surface are sufficiently small to be tolerable from the standpoint of fretting corrosion. However, space-limitations do not always admit of designing the pressure-plate so that it has the requisite thickness, and this fact is particularly true in old machines which have developed fretting-corrosion troubles in service.

It is the particular purpose of our present invention to provide means for preventing fretting-corrosion in structures in which the thickness of the pressure-plate cannot be made sufficiently great to avoid fretting-corrosion trouble without any special treatment of the two abutting surfaces. More specifically, it is an object of our invention to provide a fretting-corrosion-preventive means which provides sufficient flexibility at the abutting surfaces to permit relative motion between the parts without causing relative slippage or motion at the contacting surfaces. In other words, the tangential displacements due to said fretting-movement do not produce shearing-forces as great as the force necessary to overcome friction and produce relative tangential movement at any point in the abutting surfaces.

A more specific object of our invention is to improve a large umbrella-type vertical-shaft electric generator, or other vertical-shaft machine, in which the weight of the rotor-member is supported by a shoe-type thrust bearing in which there is danger of fretting-corrosion trouble between the top surface of the runner-plate and the bottom surface of the thrust-collar which rests thereon. In such a construction, the rotation of the runner, over the top surfaces of the bearing-shoes, develops localized pressures, at the centers of the shoes, which move around the runner-plate due to the rotating movement. At any one spot in the runner-plate, therefore, there is a pulsating normal presure, due to the shoe-reaction, and these pulsating localized pressures produce periodic unintentional fretting-movements in two directions, both circumferentially and radially, so as to tend to produce fretting-corrosion at the back or top of the runner-plate, at the point where it contacts the thrust-collar without any intentional relative movement beween these two abutting surfaces.

Two exemplary forms of embodiment of my invention are shown in the accompanying drawing, wherein:

Figure 1 is a fragmentary vertical sectional view of the right half of the upper end of an umbrella-type electric generator having a thrust-bearing assembly embodying our invention;

Fig. 2 is an enlarged diagrammatic sectional view of one of the abutting members, showing the provision of cross-cuts in the abutting surface, for providing, in effect, a plurality of cantilever beams, which take the thrust between the two abutting surfaces, and which at the same time provide sufficient lateral or tangential flexibility to avoid the frictional movements which produce fretting-corrosion;

Fig. 3 is an enlarged face-view of the resulting surface, having the criss-cross cuts therein, or a fragmentary view on the section-line III—III in Fig. 1, looking in the direction of the arrows;

Fig. 4 is a still further enlarged diagrammatic view, not to scale, which will be referred to in the explanation of the tooth-movement and the forces thereon; and Fig. 5 is an enlarged fragmentary view of an alternative means for providing sufficient flexibility at the abutting surfaces.

In Figure 1, we show the upper end of an umbrella-type generator having a stator-frame 1, which is shown broken away, as indicated at 1, and having a rotor-member which is represented by its vertical shaft 2. The weight of the rotor-member is supported by a thrust-bearing assembly 3 of the type in which a plurality of non-rotating, but pivotally supported, bearing-shoes or pads 4 are carried by a stationary structure 5 which is supported from the frame 1. The top surfaces 6 of the bearing-shoes 4 take the downward thrust of the bottom surface 6' of a rotating runner-plate 7. This runner-plate 7 has a top surface 8 which abuts against the bottom surface 9 of a thrust-collar 10 which, in the illustrated case, is cast integrally with the shaft 2.

Both the thrust-collar 10 and the runner-plate 7 are rotating at the same speed, being keyed together, as indicated at 11, and it is not intended that there should be any relative movement between the same. However, experience and tests have shown that there is the previously mentioned extremely small amount of tangential fretting-movement (or movement in the plane of the abutting surfaces 8 and 9), and this movement may be as much as 30 micro-inches, representing the maximum amount by which a point on one of the abutting surfaces is displaced relatively to what should be a corresponding point on the other abutting surface. It will be understood that the relatively rotating bearing-surfaces 6, 6' operate under oil, the top level of which is indicated at 12, said oil being contained in an oil-reservoir 13 carried by the stator-frame 1, and being cooled by suitable cooling-coils 14.

Our invention consists of the addition or provision of any suitable means for providing flexibility at the supposedly non-moving contacting surfaces 8 and 9. Any means which will provide adequate flexibility without deterioration will answer the purposes of our invention.

In Figs. 2 and 3, we have illustrated a very convenient form of flexibility-producing means, which is preferably applied to either one (or possibly both) of the abutting surfaces 8 or 9. By way of example, we have illustrated this means as being applied to the bottom surface 9 of the upper abutment-member or thrust-collar 10. The illustrated flexible means, as shown in Figs. 2 and 3, consists of a plurality of criss-crossed cuts or grooves 15, providing a plurality of teeth 16 which are illustrated, by way of example, as having a square cross-section. As shown in Fig. 2, these teeth 16 thus constitute, in effect, a plurality of spaced parallel stubby cantilever-beams, having their upper ends fixed, or built-in integrally, with respect to the material of the thrust-collar 10. These teeth or cantilever-beams 16 carry the bearing-pressure, which appears as a force N (Fig. 4) which is normal to the free ends or bottom end-faces of the beams, while at the same time the beams can be laterally deflected, as a result of the tangential (or parallel-to-the surface) displacement $d$ due to the extremely small tangential fretting-movement of a corresponding point on the other surface 8 which engages the lower end of the beam 16, resulting in the application of a tangential force T, displacing the lower end of the beam, as shown exaggeratedly in Fig. 4.

It is an essential part of our invention that the free ends of the cantilever-beams or teeth 16 should not tilt up at an angle with respect to abutting surface 8, when the beams are bent laterally, but these beam-ends should remain resting flat against said abutting surface 8, as shown diagrammatically in Fig. 4. Consequently, the beam 16 operates like a beam which is fixed or built-in at both ends, behaving like two cantilever-beams, each of one-half of the length of the tooth 16, these two hypothetical equivalent cantilever-beams being rigidly joined together at their free ends, that is, at the place corresponding to the center 17 of the tooth 16, as shown in Fig. 4.

The following nomenclature will be used in the explanation of our invention:

$L$ = length of a square-cross-sectioned beam which is built-in at both ends, in inches $b$ = one side of the square cross-section of the beam, in inches $c$ = spacing between the centers of the teeth or beams, in inches $I$ = moment of inertia = $b^4/12$ $E$ = modulus of elasticity in tension $G$ = modulus of elasticity in shear = $E/2.6$ $f$ = coefficient of friction $N$ = normal force on the end-face of each beam $n$ = normal of compression-stress, or the unit pressure on each beam-end = $N/b^2$ $T$ = tangential or shear-force on each beam-end ($T_{max} = Nf$)

$t$ = shear-stress = $T/b^2$ $s$ = bending-stress =

$$\frac{T(L/2)}{b^3/6} = \frac{3LT}{b^3}$$

$d$ = deflection of the beam, in inches

In the case of a cantilever-beam, or a beam which is fixed or built-in at only one end, with a shear-force T applied tangentially at its free end, and with a normal force N applied against the free end of the beam, the condition which is necessary to prevent one edge of the free end of the beam from tilting away from the surface which is applying the normal pressure N (that is, the condition which is necessary to make the beam equivalent to one which is built-in at both ends), is that the bending-stress $s$ must be less than the normal stress $n$, or (1) $$s < n$$

whence (2) $$\frac{3LT}{b^3} < \frac{N}{b^2}, \text{ or } N > \frac{3LT}{b}$$

The formula for the deflection $d$ is (3)
$$d = \frac{2T(L/2)^3}{3EI} + (1.2)\frac{TL}{b^2G} = \frac{TL^3}{b^4E} + (1.2)\frac{TLb^2}{b^4(E/2.6)}$$
$$= \frac{TL^3}{b^4E}\left[1 + 3.12\left(\frac{b}{L}\right)^2\right]$$

The maximum deflection which can be obtained without frictional slippage due to the normal force N depends upon the coefficient of friction $f$, and can be obtained by substituting $T_{max}=Nf$ in Equation 3. It is, $$(4) \qquad d_{max}=\frac{NfL^3}{b^4E}\left[1+3.12\left(\frac{b}{L}\right)^2\right]$$

If the actual deflection $d$ is less than this maximum or critical deflection $d_{max}$, there will be no slippage between the front faces of the teeth 16, and the surface 8 which is pressing thereagainst with a relative lateral movement having an amplitude of $d$ inches. Under these conditions, the actual tangential or shear-stress on each beam or tooth 16 will be $$(5) \qquad t=\frac{Nf}{b^2}\left(\frac{d}{d_{max}}\right)$$

and the shear-force on each tooth or beam will be $$(6) \qquad T=Nf\left(\frac{d}{d_{max}}\right)$$

By way of giving a concrete example, let us assume a construction in which $L=.375$, $b=.2$, and $c=.5$ inch, and let us assume a bearing-pressure of 400 p. s. i. (pounds per square inch) on the basis of the total bearing-face 6 or area of the runner 7. Then the unit-pressure at the ends of the teeth or beams 16 will be $$n=400\times(.5/.2)^2=2500 \ p. \ s. \ i.$$

and the normal force or pressure per tooth will be $N=2500\times(.2)^2=100$ pounds.

If we assume a coefficient of friction of $f=.2$, and a cast-iron tooth-material having $$E=15\times10^6$$

then the maximum or critical deflection which would be possible without producing slippage would be $$(4') \qquad d_{max}=\frac{100\times.2\times.375^3}{.2^4\times15\times10^6}\left[1+3.12\left(\frac{.2}{.375}\right)^2\right]$$
$$=82.9\times10^{-6} \text{ inch}$$

If we assume an actual deflection (or amplitude of relative movement) of $d=30\times10^{-6}$ inch, the shear-force on each beam or tooth 16 will be $$(6') \qquad T=100\times.2\times\left(\frac{30}{82.9}\right)=7.24 \text{ pounds}$$

which would result in a bending-stress of $$s=\frac{3\times.375\times7.24}{.2^3}=1017.5 \text{ p. s. i.}$$

in each tooth. Comparing this bending-stress $s=1017.5$ with the normal stress $n=2500$, it is seen that the condition, expressed in inequality (1), for no tilting of the tooth-ends, is satisfied with a good margin of safety. Also, the actual shear-force, $T=7.24$, on each tooth is less than the force necessary to produce slippage, or $T_{max}=100\times.2=20$, by a considerable factor of safety. Hence it will be seen that the assumed construction is a safe construction for the assumed bearing-pressure and amplitude of relative movement, so as to safely avoid fretting-corrosion.

In the design of the thrust-bearing shown in Fig. 1, the runner-plate 7, which operates as a pressure-transmitting plate, has to have accurately parallel and smooth top and bottom surfaces 8 and 6'. The bottom surface 6', in particular, has to be extremely smooth and accurate, because it constitutes the bearing-surface. On this bearing-surface, an unevenness of the order of 10 micro-inches or less, as measured by a profilometer, is satisfactory. The upper or back-surface 8 of the runner-plate 7 does not have to have such a high perfection of smoothness, because it is not a bearing-surface. On this upper surface 8, an unevenness of the order of approximately 80 micro-inches is quite sufficient, such a surface being still a very smooth surface. In fact, this order of smoothness of the upper surface 8 is desirable, because it results in a greater friction-coefficient $f$ than would have been the case if the surface had been made as smooth as the bearing-surface 6'.

It will be understood that the foregoing calculations and specific dimensions are presented only by way of illustration, and are not intended to limit our invention to the precise details indicated, except for the general essential features which have been explained.

We wish to emphasize that, in the broader aspects of our invention, any means could be used for providing the necessary flexibility between the abutting surfaces 8 and 9 where fretting-corrosion tends to exist.

Thus, in Fig. 5, we have illustrated the use of a flexible pad or composite washer, which is intended to be inserted between the abutting surfaces 8 and 9 of the two abutting members 7 and 10'. As shown in Fig. 5, this flexibility-providing means consists of a plurality of parallel stubby beams or rods 20 which extend between the two abutting surfaces 8 and 9. Preferably, these rods 20 are made of a material, such as magnesium, which is more flexible than iron or steel, or, in general, which is more flexible than the material or materials of which the abutting members 7 and 10' are made. In other words, the material of the parallel stubby beams or rods 20 has a smaller modulus of elasticity than the material of the members 7 and 10' between which they are placed.

Any suitable means may be provided for holding the parallel spaced beams or rods 20 in their parallel spaced positions. In Fig. 5, this holding-means is shown in the form of a molded-material washer 21 which is provided with a plurality of holes 22 for receiving the respective beams or rods 20. In Fig. 5, also, the beams or rods 20 are illustrated as having a spool-like configuration, each consisting of a shank-portion 23 and enlarged ends 24 and 25. The rods 20 in Fig. 5 operate the same as the beams or teeth 16 in Figs. 2 and 4, and are susceptible of a similar mathematical treatment.

While we have specifically illustrated our invention in an application to a thrust-bearing of a dynamo-electric machine or generator, and while we have illustrated only two specific forms of embodiment of our invention, we wish it to be understood that our invention is applicable to other machines in which fretting-corrosion troubles may be existent or imminent, and our invention is also susceptible of being embodied in other specific forms of embodiment. We desire, therefore, that the appended claims shall be accorded the broadest construction consistent with their language.

We claim as our invention:

1. A machine having a relatively moving member and a relatively stationary member, one of said members including a pressure-plate which is so related to the other member that there is a variable pressure-reaction or reactions normal to the front face of said pressure-plate, and an abutment-member having a surface against which the back face of said pressure-plate abuts without any relative movement other than the extremely small tangential fretting-movement due to said variable pressure-reaction or reactions, characterized by fretting-corrosion-preventive means including a plurality of spaced cuts or grooves, in the abutting surface of one of said abutting members, for providing in effect a plurality of supporting-beams having sufficient flexibility at the abutting surfaces so that the tangential displacements due to said fretting-movement do not produce shearing-forces as great as the force necessary to overcome friction and produce relative tangential movement at any point in the abutting surfaces, said beams further having such dimensions that their bending-stress under operating conditions is less than the normal shear-stress on their end-faces.

2. A machine having a relatively moving member and a relatively stationary member, one of said members including a pressure-plate which is so related to the other member that there is a variable pressure-reaction or reactions normal to the front face of said pressure plate, said variable pressure-reaction being confined to a spot of limited extent in two different directions, and an abutment-member having a surface against which the back face of said pressure-plate abuts without any relative movement other than the extremely small tangential fretting-movement due to said variable pressure-reaction or reactions, characterized by fretting-corrosion-preventive means including two sets of intersecting cuts, or grooves, crossing each other, each set including a plurality of spaced cuts or grooves, in the abutting surface of one of said abutting members, for providing in effect a plurality of supporting-beams having sufficient flexibility at the abutting surfaces, in both of said directions, so that the tangential displacements due to said fretting-movement do not produce shearing-forces as great as the force necessary to overcome friction and produce relative tangential movement at any point in the abutting surfaces, said beams further having such dimensions that their bending-stress under operating conditions is less than the normal shear-stress on their end-faces.

3. A vertical-shaft machine comprising a stator-member and a vertical-shaft rotor-member, said machine having a thrust-bearing for supporting the weight of the rotor-member and having a plurality of non-rotating bearing-shoes supported by said stator-member, a rotating runner-plate having a bottom bearing-surface pressing against the tops of said shoes, and a rotating thrust-collar which is rigidly secured to said shaft and which has a lower abutment-surface against which the top backing surface of said runner-plate abuts without any relative movement other than the extremely small fretting-movement due to the rotation of the centers of pressure existing in the centers of the shoe-surfaces as the runner-plate rotates over the shoes, said thrust-bearing being characterized by fretting-corrosion-preventive means including two sets of intersecting cuts, or grooves, crossing each other, each set including a plurality of spaced cuts or grooves, in the abutting surface of one of said abutting members, for providing in effect a plurality of supporting-beams having sufficient flexibility at the abutting surfaces so that the tangential displacements due to said fretting-movement do not produce shearing-forces as great as the force necessary to overcome friction and produce relative tangential movement at any point in the abutting surfaces, said beams further having such dimensions that their bending-stress under operating conditions is less than the normal shear-stress on their end-faces.

RENÉ A. BAUDRY.
PAUL R. HELLER.

REFERENCES CITED

The following references are of record in the file of this patent:

UNITED STATES PATENTS

| Number | Name | Date |
|---|---|---|
| 1,331,108 | Howarth | Feb. 17, 1920 |
| 1,825,519 | Gordon | Sept. 29, 1931 |
| 2,463,010 | Almen | Mar. 1, 1949 |